United States Patent
Eyler

[15] 3,700,920
[45] Oct. 24, 1972

[54] FREQUENCY INDEPENDENT PEAK DETECTOR
[72] Inventor: Francis R. Eyler, Hanover, Pa.
[73] Assignee: The Bendix Corporation
[22] Filed: May 6, 1971
[21] Appl. No.: 140,930

[52] U.S. Cl.............307/235 A, 328/115, 328/150, 330/30 D
[51] Int. Cl.............................................H03k 5/20
[58] Field of Search......328/115, 150, 127; 307/235, 307/235 A; 330/30 D; 331/107

[56] References Cited

UNITED STATES PATENTS

| 3,048,717 | 8/1962 | Jenkins | 328/150 |
| 3,073,968 | 1/1963 | Tribby | 307/235 A |
| 3,496,383 | 2/1970 | Tomsa | 307/235 A |
| 3,588,722 | 1/1969 | Hoelscher | 307/235 A |

OTHER PUBLICATIONS
Electronic Design,- 3-1-70, Vote-Active Filter Design Uses Basic Language p. 83, 330- 107

Primary Examiner—Herman Karl Saalbach
Assistant Examiner—R. C. Woodbridge
Attorney—Plante, Hartz, Smith & Thompson, Bruce L. Lamb and William G. Christoforo

[57] ABSTRACT

A frequency independent peak detector includes a circuit for differentiating the signal whose peak is to be detected, with the output of the differentiating circuit being applied to a high gain amplifier whose output is either in a high or low state, depending on what state the differentiated signal is in. The differentiating circuit is comprised of a capacitor and a diode operating as a resistance which varies inversely proportional to frequency by virtue of the fact it is biased to operate in the exponential region of its volt-ampere characteristic. This compensates for the change in capacitor reactance as the input signal frequency varies to maintain the frequency-RC time constant product of the circuit relatively constant.

3 Claims, 1 Drawing Figure

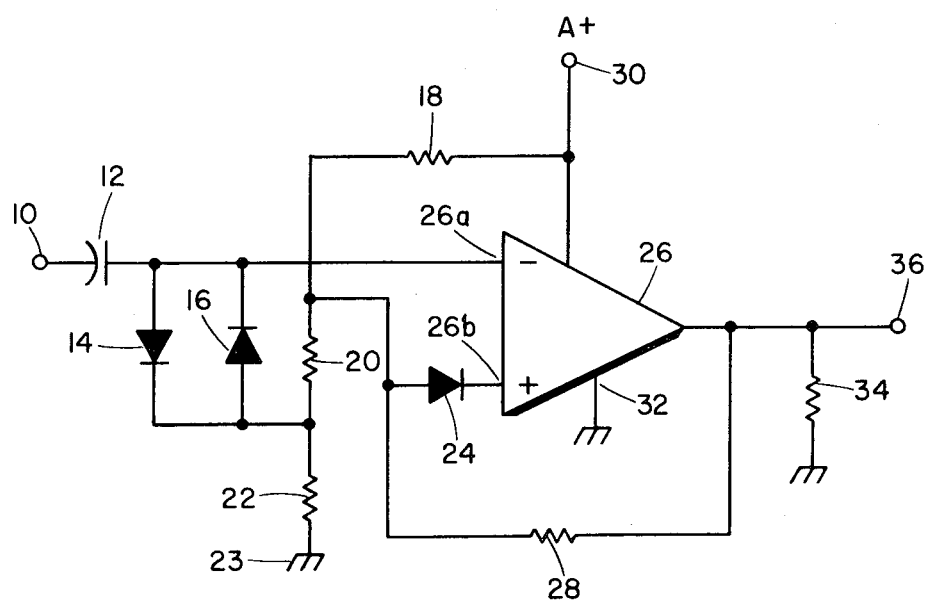
INVENTOR
FRANCIS R. EYLER
BY
William G. Christoforo
ATTORNEY

FREQUENCY INDEPENDENT PEAK DETECTOR

BACKGROUND OF THE INVENTION

This invention relates to an electrical peak detector of the type particularly adapted for use in an adaptive braking system for automotive vehicles, trucks and the like, and more particularly to a peak detector whose output characteristics are essentially independent of input signal frequency.

Adaptive braking systems for wheeled vehicles are known wherein the acceleration and deceleration of the wheels is sensed and, after the brakes have been applied by the operator during a desired stop, wheel braking pressure is automatically relieved when certain wheel dynamic characteristics occur. For example, the wheel braking pressure may be relieved if the wheel decelerates during braking at a rate greater than a preset optimum rate. The occurrence of these dynamic wheel conditions generally indicates that wheel lock-up, with resultant deterioration of vehicle braking characteristics, is imminent. The automatic release of the brakes prevents wheel lock-up and tire skidding and allows the wheel to continue to rotate during vehicle braking for more efficient brake operation. Of course, it is necessary that once the wheel braking pressure has been relieved to reapply the braking pressure automatically once it is determined such action is desirable from the standpoint of bringing the vehicle to a safe controlled stop. It has been determined that if the braking pressure is reapplied after a fixed change in wheel acceleration from the wheel acceleration peak, excellent vehicle braking characteristics are obtained. Normally, this time for reapplying braking pressure may be simply determined by sensing the wheel acceleration signal with a peak acceleration detector having an offset equivalent to the aforementioned fixed change of wheel acceleration. However, the rate at which the wheel accelerates after the brake has been released varies, depending upon the the characteristics of the tire-road interface. For example, if the wheel is accelerating on a slippery surface it will accelerate at a relatively slow rate. On the other hand, if the wheel is accelerating on a dry surface the wheel will accelerate at a relatively high rate. Generally, peak detectors are sensitive to the frequency of the applied signal and hence, not of optimal design for the type of adaptive braking system hereinabove described.

SUMMARY OF THE INVENTION

It is desirable that the peak detector to be used in an adaptive braking system be relatively insensitive to the frequency of an applied acceleration signal. It is thus an object of this invention to provide a frequency independent peak detector for use in an adaptive braking system. This is accomplished by providing a circuit which is basically an RC differentiator, followed by a high gain amplifier whose output is either in a high or low state depending on what state the differentiated signal is in. The input signal is the wheel acceleration signal of the adaptive braking system. In the system to be described, peak acceleration occurs during a negative peak value of the electrical signal corresponding to acceleration. Hence, when the input signal reaches a negative peak value the output of the differentiator and hence the input to the amplifier is zero. Further, when the input signal decays towards zero from this negative peak value, the output of the differentiator and hence the input to the amplifier becomes positive. At some threshold value, which is approximately the input offset on the amplifier, the amplifier output switches to a low state thus producing a negative pulse at its output which can be applied to a utilization circuit for reapplying the vehicle brakes.

The R of the RC differentiator is provided by a diode biased to operate in the exponential region of its volt-ampere characteristic to compensate for the change of reactance of the capacitor as input frequency changes. It is thus another object of this invention to provide an RC differentiator whose output is relatively independent of the frequency of the applied signal.

One more object of this invention is to provide a peak detector particularly adapted for use in an adaptive braking system.

These and other objects of the invention will be made apparent by reading of the following description of the preferred embodiment and appended claims.

The FIGURE is a schematic of one embodiment of the invention.

DESCRIPTION OF THE PREFERRED EMBODIMENT

In the drawing the elements are poled for detecting the negative peak of a varying electrical signal and thus this form of the invention is particularly adapted for use in an adaptive braking system where a negative peak of the wheel acceleration signal corresponds to peak acceleration of the wheel. It will be obvious to one skilled in the art after a reading of this description of the preferred embodiment how to adapt the circuit shown for use in detecting the positive peaks of an electrical signal if such is desired. Referring now to the FIGURE, there is seen an input terminal 10 which is connected to receive the wheel acceleration signal from an adaptive braking system control channel. Input terminal 10 is connected through capacitor 12 to one input 26a of a high gain differential amplifier 26. Connected also to input terminal 26a is the anode of a diode 14 and the cathode of a diode 16. These diodes are connected in parallel with one another so as to have the cathode of one connected to the anode of another. A source of A+ voltage supplied at terminal 30 while a terminal 23 is connected to ground. A resistor string consisting of resistors 18, 20 and 22 is connected between terminals 30 and 23, that is, across the A+ voltage source. A common terminal of diodes 14 and 16 is connected at the junction of resistors 20 and 22. A third diode 24 has its cathode connected to amplifier input terminal 26b and its anode connected at the junction between resistors 18 and 20. A load resistor 34 is connected between amplifier output terminal 36 and ground. A feedback resistor 28 is connected between output terminal 36 and the anode of diode 24 to provide positive feedback and thus speed up the switching time of amplifier 26. Amplifier 26 is provided with A+ voltage from terminal 30 and is connected to ground at a terminal 32. It should be particularly noted that capacitor 12 and diode 16 comprise an RC differentiator during the charging time of capacitor 12, where the diode is biased to normally operate at the knee of its characteristic curve. This provides an inexpensive means of maintaining a relatively fixed frequency/RC time constant product during capacitor 12 charge time. For example, if the input frequency increases the reactance of capacitor 12 decreases allowing more current to flow through diode 16. This moves the average operating point of diode 16 further up the curve of its volt-ampere characteristic, to a lower resistance point. Hence, as frequency increases, R decreases. Of course, the reverse is also true, that is, as frequency decreases, R increases. This feature allows the output amplitude of the differentiator to be independent of input amplitude. These two characteristics are necessary to maintain the output switching threshold fixed at some predetermined change of acceleration past the peak over a range of input frequencies and amplitudes. This allows the circuit to have a large degree of noise immunity across the entire frequency band of interest since this threshold can be accurately set and maintained at some level greater than the input noise.

Continuing with the description of the circuit, when the input signal at terminal 10 reaches a negative peak value corresponding to peak wheel acceleration, the output of the differentiator, which appears at input terminal 26a, becomes zero. Further, when the input signal at terminal 10 now decays toward zero from its negative peak value, the output of the differentiator (input to the amplifier) now becomes positive.

It will be noted that the d.c. bias applied to input terminal 26a from the A+ voltage source at terminal 30 through resistors 18 and 20 and diode 16 is identical to the d.c. bias applied to amplifier input terminal 26b except for the voltage drop across resistor 20. This last mentioned voltage drop is an input offset on the amplifier which is fixed by the circuit designer in accordance with the desired change of wheel acceleration after the peak value is detected at which an output from amplifier 26 is desired. In short, by choosing the proper value of resistor 20 the circuit designer has a means of obtaining an output pulse at the amplifier output terminal 36 whose leading edge occurs at any predetermined point, ranging from the acceleration maximum for a resistance equal to zero to lesser accelerations occurring after the peak for larger values of resistor 20. Thus, at some threshold level, which is approximately the input offset voltage on the amplifier caused by the drop across resistor 20, the amplifier output switches to its low state, thus producing a negative pulse at its output terminal 36.

Diode 14 is provided for the rapid discharge of capacitor 12, once the input signal at terminal 10 has passed its negative peak. Diode 24 provides a practically identical d.c. voltage drop as diode 16 for the biasing of the various amplifier input terminals and in addition provides temperature compensation for diode 16.

Hence, we have shown that for an increase in frequency the resistance of diode 16 is decreased, tending to maintain a constant amplitude at the output of the differentiator during capacitor 12 charge time, that is, at amplifier input terminal 26a. The opposite action will, of course, occur for a decrease in frequency.

The above diode phenomena is also the mechanism which allows the output of the differentiator to be independent of the input amplitude. For example, an increase in input voltage at terminal 10 would tend to cause an increase in voltage across diode 16 and hence decrease its resistance as has previously been discussed. Again, the opposite action would occur for a decrease in input voltage. Hence, it has been shown that the relative output amplitude of the differentiator is independent of both input frequency and input amplitude during capacitor charging time.

Having described the above preferred embodiment to my invention, I claim that subject matter and obvious modifications thereof encompassed by the true scope and spirit of the appended claims.

The invention claimed is:

1. A frequency independent peak detector comprising:
    a differential amplifier having a first and second input terminal;
    a peak detector input terminal;
    a capacitor connected between said peak detector input terminal and said first input terminal;
    a first diode having an anode electrode connected to said first input terminal, and a cathode electrode;
    a second diode having a cathode electrode connected to said first input terminal, and an anode electrode;
    a d.c. voltage source;
    a resistance ladder connected across said d.c. voltage source; the cathode electrode of said first diode and the anode electrode of said second diode being connected together and to a first point within said resistance ladder; and,
    a third diode connected between said second input terminal and a second point within said resistance ladder.

2. A frequency independent peak detector as recited in claim 1 wherein the resistance between said first and second resistance ladder interior points corresponds to a d.c. offset voltage applied to said first and second input terminals.

3. A frequency independent peak detector as recited in claim 2 with additionally a relatively high resistance resistor connected between the output of said amplifier and said second interior point.

* * * * *